United States Patent [19]

Typpo

[11] Patent Number: 4,929,895
[45] Date of Patent: May 29, 1990

[54] THICKNESS GAUGE FOR MOVING SHEET MATERIAL WITH INNER AND OUTER FLEXIBLY MOUNTED BEARINGS

[75] Inventor: Pekka M. Typpo, Cupertino, Calif.

[73] Assignee: Impact Systems, Inc., San Jose, Calif.

[21] Appl. No.: 326,906

[22] Filed: Mar. 22, 1989

[51] Int. Cl.[5] ............... G01B 7/10; D21F 7/06; G01R 33/12
[52] U.S. Cl. ............... 324/231; 73/159; 162/263
[58] Field of Search ............... 324/229-231; 340/675; 162/198, 263; 33/834; 73/159; 271/262, 263

[56] References Cited

U.S. PATENT DOCUMENTS

| 3,528,002 | 9/1970 | Dunlavey | 324/231 |
| 3,818,327 | 6/1974 | Alexander | 324/231 |
| 3,828,248 | 8/1974 | Wennerberg | 324/231 |
| 3,855,524 | 12/1974 | Crawford | 324/231 |
| 4,107,606 | 8/1978 | Typpo et al. | 324/229 |
| 4,107,847 | 8/1978 | Typpo et al. | 324/231 X |
| 4,791,367 | 12/1988 | Typpo | 324/229 |

Primary Examiner—Gerard R. Strecker
Attorney, Agent, or Firm—Flehr, Hohbach, Test, Albritton & Herbert

[57] ABSTRACT

A caliper gauge for relatively thin moving sheet material is provided by the use of an outer ring type air bearing, flexibly supported, which is flexibly connected again to an inner air bearing carrying the magnetic measuring components. The outer air bearing (with its juxtaposed mate) tends to flatten the sheet so that minimum movement is required of the independently actuated inner air bearing. Thus, great accuracy is achieved and tearing or marking of the sheet material, such as super calendered or coated grades of paper, is avoided.

8 Claims, 3 Drawing Sheets

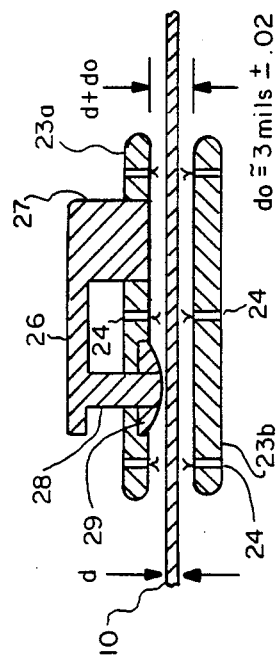
FIG.—5
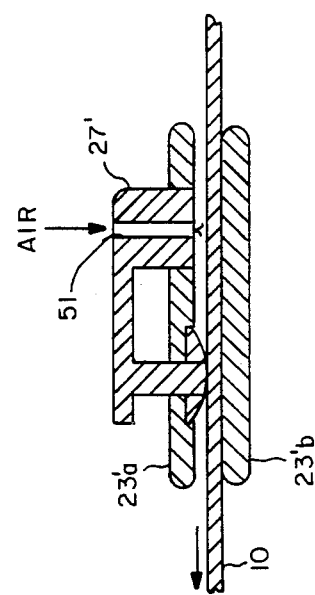
FIG.—6
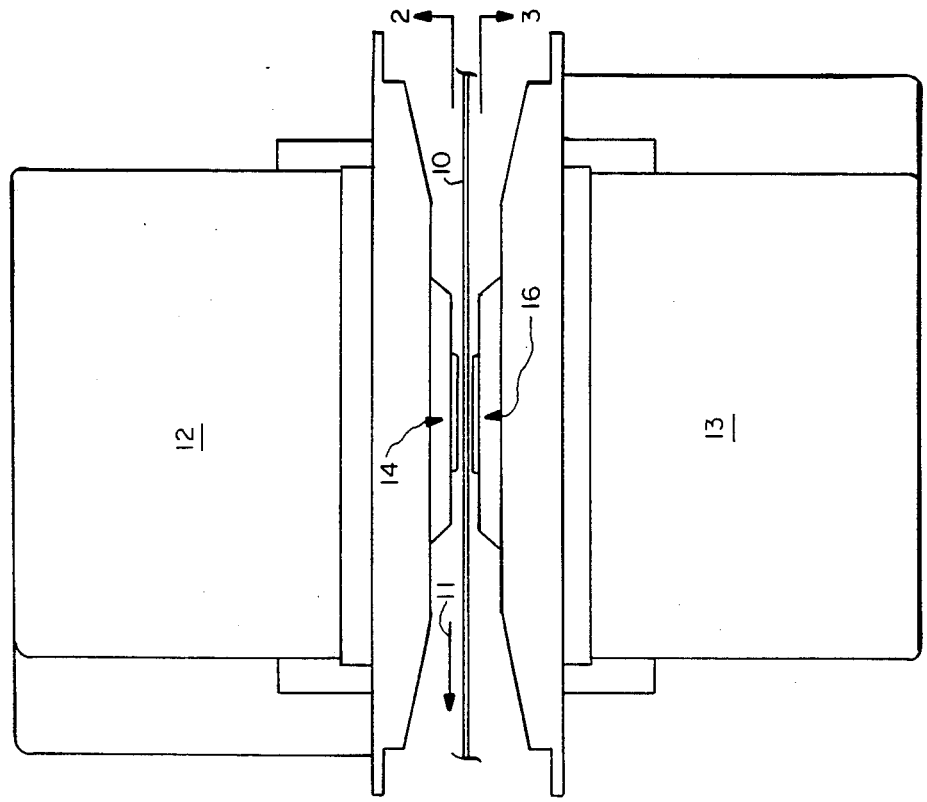
FIG.—1

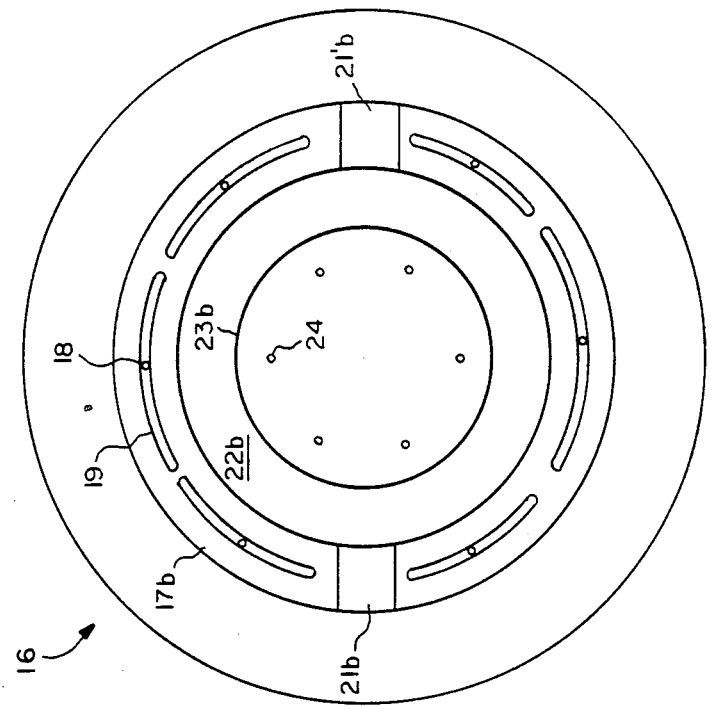
FIG.—3
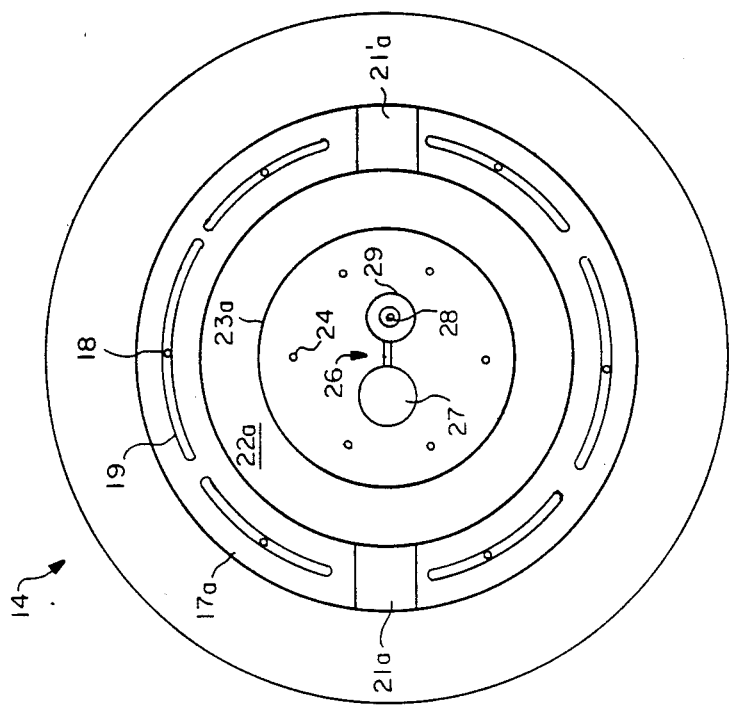
FIG.—2

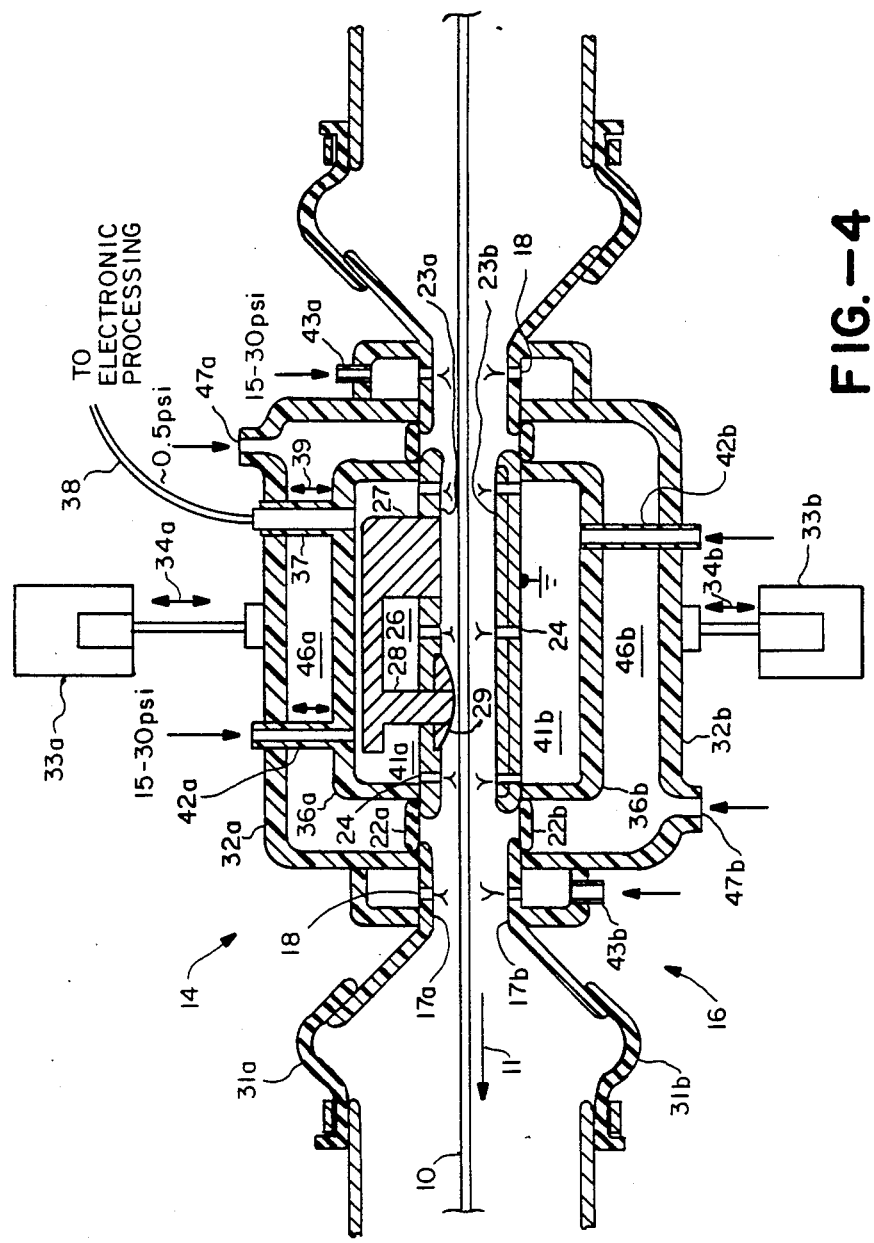

THICKNESS GAUGE FOR MOVING SHEET MATERIAL WITH INNER AND OUTER FLEXIBLY MOUNTED BEARINGS

The present invention is directed to a thickness gauge for moving sheet material and more particularly for measuring the caliper of paper.

BACKGROUND OF THE INVENTION

In the measurement of caliper of paper, especially relatively thin paper, the use of air bearings has been thought to be unsatisfactory because of inherently poor accuracy. For example, because of the tendency of air bearings to compress due to forces and the passline of the moving sheet material, they are too inaccurate. For example, errors of 2-4% are common.

To reduce the error to the required less than 1%, prior techniques have tended to use some contacting type of caliper sensor. For example, one known type provides a measuring gauge on both sides of the paper with one side having a suction applied to it to maintain the paper flat. Again, this is a large area of contact and unless carefully done, tends to easily rip the paper. Another technique is the use of wheels which make contact with the paper. Here there are acceleration problems when the speed of the paper changes. Then another construction uses a pair of skids. All of the foregoing techniques have a type of contact with the moving paper which, when it has a relatively thin thickness or caliper, is very susceptible to marking or damage.

OBJECTS AND SUMMARY OF INVENTION

It is therefore an object of the present invention to provide an improved thickness gauge for moving sheet material.

In accordance with the above object, there is provided a thickness gauge for moving sheet material comprising first and second magnetic circuit means juxtaposed on opposite sides of the sheet for providing a magnetic flux path through the sheet indicative of the thickness of the sheet. Upper and lower means on opposite sides of the sheet are provided for respectively flexibly carrying the first and second magnetic circuit means. Each of the upper and lower means includes outer bearing means including an outer rigid ring with a plurality of spaced air exit means around the circumference, for providing an air bearing between the ring and the sheet. Means are further provided for flexibly causing the outer ring to move toward engagement with the sheet, the opposed outer rings of the upper and lower means tending to flatten a portion of the sheet encompassed by the rings. Rigid inner disk-like bearing means are respectively provided, which include the first or second magnetic circuit means. The inner and outer bearing means are flexibly connected to place them in substantially the same plane. Finally means are provided for flexibly causing the inner bearing means to move the magnetic circuit means toward engagement with the sheet.

BRIEF DESCRIPTION OF THE DRAWINGS

FIG. 1 is an elevation view of the overall apparatus of the present invention as it would be installed in the path of a papermaking machine.

FIG. 2 is a plan view taken along the lines 2—2.

FIG. 3 is a plan view taken along the lines 3—3.

FIG. 4 is an enlarged cross-sectional view of a portion of FIG. 1 showing the invention in greater detail.

FIG. 5 is a simplified view of a portion of FIG. 4.

FIG. 6 is an alternative embodiment of FIG. 5.

DESCRIPTION OF THE PREFERRED EMBODIMENTS

Referring to FIG. 1, the thickness or caliper gauge of the present invention is used in conjunction with a scanner which traverses or scans across the longitudinally moving paper 10 in the direction 11 (as shown by the arrow) being produced by a papermaking machine. A framework (not shown), which is in a cross-direction to the machine direction 11 of the paper sheet 10, includes an upper gauge portion 12 and a lower gauge portion 13. The crucial components of the thickness or caliper gauge are contained in the juxtaposed portions close to the sheet shown at 14 and 16 for the upper and lower gauge portions respectively.

Referring both to FIGS. 2 and 3 which are generally similar to each other except for the electrical measuring portions, outer bearings 17a and 17b are formed of a rigid ring with a plurality of spaced air exits 18 around the circumference of each of the rings. With a flow of air, these provide an air bearing between each of the rings and the sheet 10. Each of the air exits 18 includes an elongated trough or groove 19, which provides for equal distribution of the air cushion around the entire circumference of the outer air bearing.

Finally, each of the rings includes an air relief path or spillway 21a and 21'a for the upper portion of FIG. 2 and 21b and 21'b for the lower portion of FIG. 3. These air relief paths may be unnecessary in some circumstances.

Connected to the outer rings 17a, 17b by elastomeric annular sheets 22a, 22b are inner bearings which are of a disk-like shape 23a, 23b. Each includes around its periphery a series of air exits 24 which again provide, with the use of a source of compressed air, an air bearing against the moving sheet 11. (As will be discussed below in an alternate embodiment of FIG. 6, these can partially be eliminated.) The annular sheets 22a and 22b provide that the inner bearings 23a, 23b are in substantially the same plane as the outer air bearings or rings 17a, 17b, as will be apparent by referring briefly to the cross-section of FIG. 4.

From an electrical measurement standpoint, disk 23a of FIG. 2 carries the active part of the magnetic circuit which consists of U-shaped pole piece generally indicated at 26 having a large end 27 and a smaller end 28 which is surrounded by a jewel bearing 29. This is inset into the disk 23a which may be of a suitable ceramic.

Disk 23b of FIG. 3 illustrates the passive part of the magnetic circuit where disk 23b can be of any magnetic material, either metal or ceramic, as long as its frictional characteristics are suitable.

FIG. 5 shows a very simplified operating view of the inner air bearings 23a and 23b, where the U-shaped magnetic pole piece 26 provides a flux path through its two legs 27 and 28, which crosses through the air gap in paper 10, the paper having a thickness "d" and the air gap "$d_0$", and where the flux path continues through the lower inner air bearing 23b the air gap "$d_0$" is of course the space between paper sheet 10 and the opposed bearings 23a and 23b. Also the air exit means 24 show the air bearing effect and where the jewel bearing 29 and the small magnetic leg 28 protrudes approximately mm but still does not contact the sheet 10. As will be discussed below and as indicated on the drawing, the present invention provides for an accuracy of less than 1%. Thus, the distance $d_0$ is indicated as being approximately 3 mils, with a variation of only ±0.02 mils.

In general, the above magnetic circuit is fully disclosed and claimed in U.S. Pat. No. 4,791,367 granted to Pella M. Typpo and assigned to the present assignee.

Referring now to the very detailed showing of FIG. 4 (compared to the brief showing of FIG. 5) of the upper and lower portions 14 and 16, the outer bearing means 17a and 17b are flexibly caused to move toward moving sheet 10 by use of the flexible annular couplings 31a and 31b in combination with the cup-like holding structure 32a, 32b for the rings which are driven respectively by piston units 33a and 33b. The piston shaft and its movement is illustrated by the arrows 34a, 34b with the shaft being attached to the top of the cup-like housings 32a, 32b.

Inside each housing 32a, 32b is an inner housing 36a, 36b which retains inner air bearings 23a,23b as illustrated. A feedthrough structure 37 carries the electrical circuits 38 which connect to U-shaped pole piece 26 and the legs 27 and 28. The circuit is more fully explained in the above mentioned Typpo patent and continues to an electronic processing unit (not shown). The feedthrough 37, as indicated by arrow 39, is movable in the top of housing 32a but provides an airtight feedthrough both for the housing 32a and the inner housing 36a.

Inner housings 36a, 36b, in addition to retaining the inner bearing member and associated magnetic circuit means, also provide an airtight enclosure 41a, 41b. These enclosures are coupled via the air inlets 42a and 42b, which are coupled to sources of compressed air indicated as, for example, being from 15 to 30 psi. This is the source for the air bearings formed by the air exits 24. And this air bearing type of structure has been more clearly shown in FIG. 5, of course. Again, a suitable airtight feedthrough is provided.

Next, for the outer air bearings 17a, 17b, air inlets 43a,43b connected to the same source of air provide the air for the outer air bearing and its air exits 18.

To provide means for flexibly causing the inner bearing means to move toward the sheet there is formed a plenum 46a, 46b which encompasses the flexible connection 22a, 22b between the inner and outer bearings. The top portion is outer housing 32a, 32b and the other portion of the plenum the inner shell 36a, 36b. Feeding or pressurizing this plenum is an air inlet 47a, 47b fed by a source of compressed air indicated typically as being 0.5 psi. This causes the flexibly mounted inner air bearing and its housing 36a all to move toward the sheet 10, thereby carrying the magnetic circuit components (including the U-shaped magnet 26 and the bearing 23b) toward sheet 10. In practice the bearings, because they are air bearings, do not contact the sheet. Normally the only contact made is the leg 28 and its associated jewel bearing 29. And the contact is made on the optimum trailing edge of the gauge, as determined by the direction of motion 11 of the moving paper sheet 10.

FIG. 6 shows an alternative embodiment for the inner bearing where bearing 23'b now bears against sheet 10 and is made of suitable material so that the friction is low. And the upper bearing 23'a also bears against the sheet and rather than having several peripheral or circumferential air exits, has just a single exit through a large pole piece leg 27', namely air exit 51. (However, the original air bearing construction could still be used but with lower pressure.) The foregoing construction is partially shown of course in an entirely different context, in the above mentioned Typpo patent, namely at FIG. 3.

In operation the construction of the present invention in effect isolates the force of the outer 17b from the inner bearings 23a, 23b. The outer bearings can tilt as much as 3 mils to flatten the moving sheet and provide a minimal need of adjustment of the inner air bearing. This adjustment is of course provided by the air pressure to the plenums 46a, 46b. Thus, such adjustment, after the paper has been flattened by the outer air bearing, may amount as indicated in FIG. 5 to as little as ±0.02 mills. This is well below the 1% tolerable error. Since the sheet is flattened by the relatively massive outer air bearing, the inner air bearing requires only a minimum of flexure to achieve the proper orientation. It is in effect isolated from all outside forces. Moreover, because of the suspension of the inner air bearing in substantially the same plane as the outer bearing, no unwanted elastic forces are introduced into the structure. Thus, an improved caliper sensor has been provided which effectively uses air bearings on relatively thin moving paper sheets but with great accuracy. Effects of tearing and marking have been substantially eliminated.

I claim:

1. A thickness gauge for moving sheet material comprising:

first and second magnetic circuit means juxtaposed on opposite sides of said sheet indicative of the thickness of said sheet; upper and lower means on opposite sides of said sheet for respectively flexibly carrying said first and second magnetic circuit means, each of said upper and lower means including:

outer bearing means including an outer rigid ring with a plurality of spaced air exit means around the circumference of such outer ring for providing an air bearing between said ring and said sheet;

means for flexibly causing said outer ring to move toward engagement with said sheet, said opposed outer rings of said upper and lower means tending to flatten a portion of said sheet encompassed by said rings;

rigid inner disk-like bearing means respectively carrying said first and second magnetic circuit means;

means for flexibly connecting said inner disk-like bearing means to said rigid ring of said outer bearing means to place them in substantially the same plane;

and means for flexibly causing said inner bearing means to move said magnetic circuit means toward engagement with said sheet.

2. A thickness gauge as in claim 1 where said means for flexibly causing said outer ring to move toward said sheet includes piston means and flexible mounting means for said outer ring.

3. A thickness gauge as in claim 1 where said means for flexibly causing said magnetic circuit means to move toward said sheet includes an air plenum encompassing said flexible connection means and a source of compressed air connected to said air plenum.

4. A thickness gauge as in claim 1 where said outer ring includes air spillways.

5. A thickness gauge as in claim 4 where said spillways are radial grooves in said outer ring.

6. A thickness gauge as in claim 1 where said disk-like bearing means includes air exit means for providing an air bearing.

7. A thickness gauge as in claim 6 where at least a portion of said magnetic circuit means is normally in contact with said sheet.

8. A thickness gauge as in claim 1 where said means for flexibly connecting said inner and outer bearing means include an elastomeric annular sheet.

* * * * *